United States Patent [19]

Wehmeyer et al.

[11] Patent Number: 5,781,247
[45] Date of Patent: Jul. 14, 1998

[54] CUSTOMIZABLE MENU FOR A TELEVISION RECEIVER ACCESSED VIA A REMOTE CONTROL KEYBOARD

[75] Inventors: Keith Reynolds Wehmeyer, Fishers; Jeffrey Philip Reavis; Robert Howard Miller, both of Indianapolis; Foy Edward Wilkey, Fishers, all of Ind.

[73] Assignee: Thomson Consumer Electronics, Inc., Indianapolis, Ind.

[21] Appl. No.: 419,859

[22] Filed: Apr. 5, 1995

[51] Int. Cl.$^6$ .................................................. H04N 5/50
[52] U.S. Cl. ........................ 348/569; 348/563; 345/352
[58] Field of Search ................................. 348/734, 731, 348/563, 564, 569, 570; 345/352, 353, 354, 146; H04N 5/50, 5/44

[56] References Cited

U.S. PATENT DOCUMENTS

| | | | |
|---|---|---|---|
| 4,626,892 | 12/1986 | Nortrup et al. | 348/569 |
| 5,041,967 | 8/1991 | Ephrath et al. | 364/200 |
| 5,115,501 | 5/1992 | Kerr | 395/600 |
| 5,212,553 | 5/1993 | Maruoka | 348/563 |
| 5,220,675 | 6/1993 | Padawer et al. | 395/800 |
| 5,287,514 | 2/1994 | Gram | 395/700 |
| 5,384,910 | 1/1995 | Torres | 395/156 |
| 5,386,507 | 1/1995 | Teig et al. | 395/161 |
| 5,479,266 | 12/1995 | Young et al. | 348/734 |
| 5,598,523 | 1/1997 | Fujita | 348/13 |

FOREIGN PATENT DOCUMENTS

| | | | |
|---|---|---|---|
| 046842A2 | 3/1992 | European Pat. Off. | H04N 5/445 |
| 2155714 | 9/1985 | United Kingdom | H04N 5/44 |

OTHER PUBLICATIONS

Microsoft Word for Macintosh/User Guide/Document No. OB-23345-0991Chapter 40 pp. 716-730.
IBM Technical Disclosure Bulletin—vol. 33 No. 3A Aug., 1990.

*Primary Examiner*—Michael H. Lee
*Attorney, Agent, or Firm*—Joseph S. Tripoli; Peter M. Emanuel; Robert D. Shedd

[57] ABSTRACT

A television receiver, provides a hierarchy of menus for controlling functions affecting the display of the video image. A "fetch" menu which can be customized by a user, which is absent from the screen during normal program viewing, and which is easily accessible by means of a single key, holds a given number of the user's favorite commands. The user may add commands to the fetch menu which normally reside any position in the menu hierarchy. The user may thereafter cause display of his list of favorite commands via a remote control key, and cause the execution of his desired command without having to find that command at its normal position in the hierarchy.

20 Claims, 5 Drawing Sheets

1

CUSTOMIZABLE MENU FOR A TELEVISION RECEIVER ACCESSED VIA A REMOTE CONTROL KEYBOARD

FIELD OF THE INVENTION

The subject invention generally concerns menu generation circuitry for electronics equipment, such as, television receivers, and specifically relates to a novel "FETCH" menu, a user-customizable menu for holding a list of the user's favorite commands.

BACKGROUND OF THE INVENTION

Control of modern television receivers has become increasingly complicated in recent years, as more and more user-controllable features have been implemented by manufacturers in television receivers of ever-greater complexity. For example, in addition to the normal television receiver controls, some user-controllable features which were unheard-of just a few years ago are now commonly available to consumers, such as, COLOR TEMPERATURE, VIDEO NOISE REDUCTION, SURROUND SOUND, and SLEEP TIMER, just to name a few.

In an attempt to present an orderly array of these controllable functions, manufacturers introduced the concept of function control menus. In such well-known schemes, a menu is called up to the screen, and a particular function to be controlled, such as COLOR, is selected by the viewer for adjustment. Unfortunately, the menus soon grew too long for convenient screen display, and were expanded to include sub-menus allowing selection of related items. For example, selecting the menu item entitled VIDEO brings up yet another menu listing such related items as, BRIGHTNESS, CONTRAST, COLOR, TINT, SHARPNESS, COLOR TEMPERATURE, and VIDEO NOISE REDUCTION. While such an arrangement may seem straight-forward to a computer programmer, it may be extremely confusing, and even intimidating, to the average nontechnical user, who was quite happy to adjust the brightness of his receiver by turning a knob on the front panel, without having to wade through a mire of menus and submenus to accomplish that simple task. In many cases, complex hierarchical menus found on today's receivers must be searched from top to bottom in order to locate the desired function to be executed. It is noted that the location of commands within the hierarchy may have seemed "intuitively obvious" to the programmer, but may be confusing to the nontechnical user.

SUMMARY OF THE INVENTION

A television receiver, provides a hierarchy of menus for controlling functions affecting the display of the video image. A "fetch" menu which can be customized by a user, which is absent from the screen during normal program viewing, and which is easily accessible by means of a remote control keypad, holds a given number of the user's favorite commands. The user may add commands to the fetch menu which normally reside in any position in the menu hierarchy. The user may thereafter cause display of his list of favorite commands via the remote control keypad, and cause the execution of his desired command without having to find that command at its normal position in the hierarchy.

DETAILED DESCRIPTION OF THE DRAWING

Figure 1:
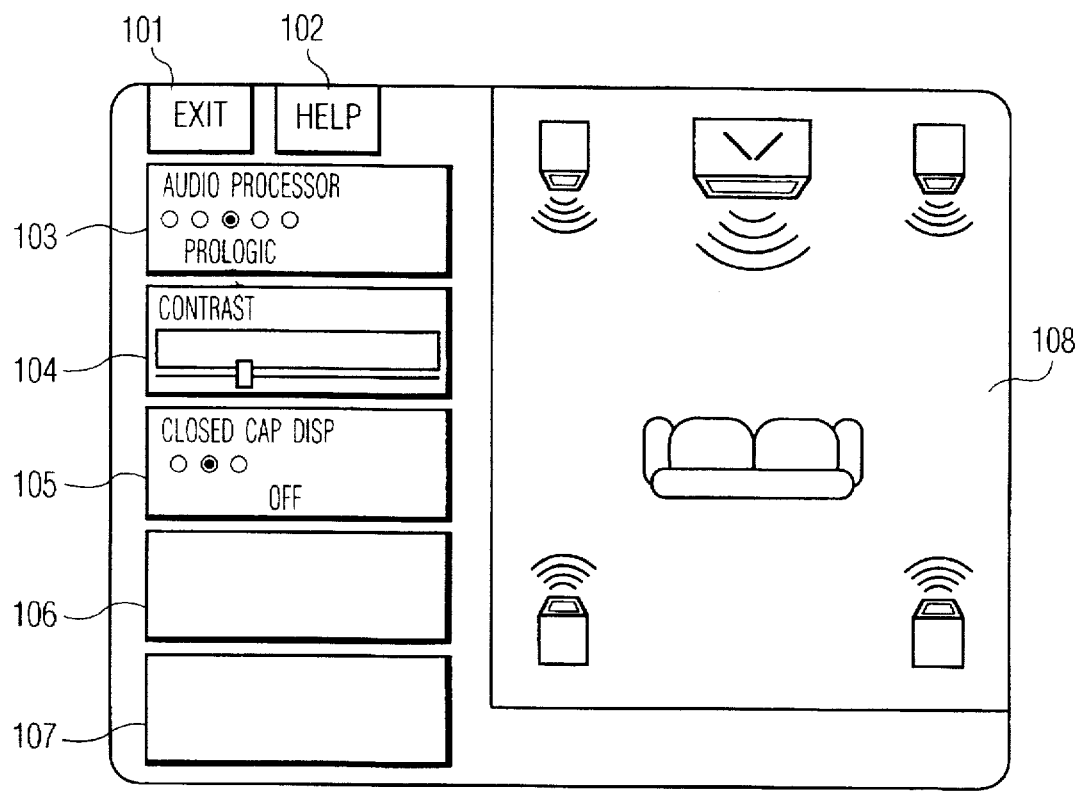
FIGS. 1–3 and 7 show illustrations of screen displays of menus of user-selectable functions.
Figure 4:
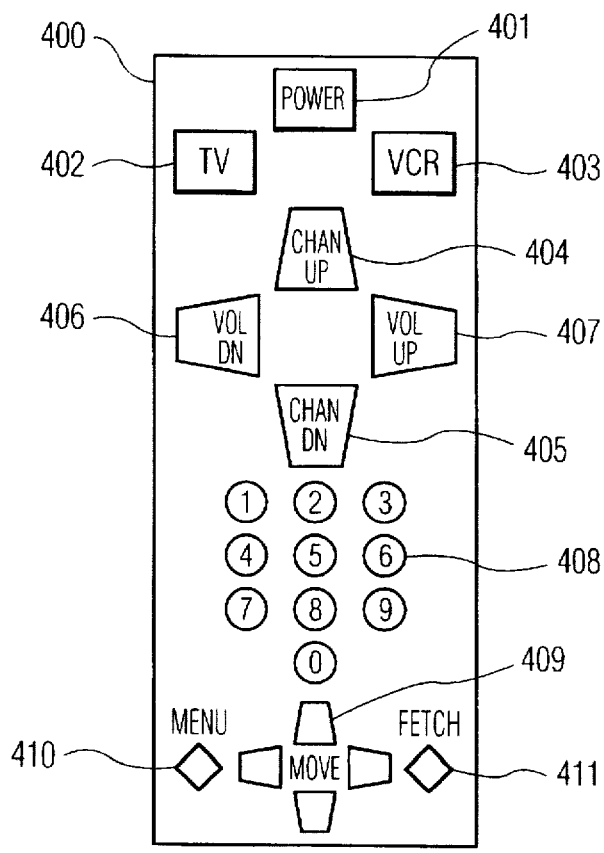
FIG. 4 is a simplified drawing of a remote control unit suitable for use with the invention.

FIGS. 1 and 4 will be referred-to concurrently in the following discussion. FIG. 1 illustrates a screen display produced in response to the pressing of a FETCH key on a remote control unit such as remote control unit 400 shown in FIG. 4. FIG. 1 shows, on its right-most portion 108, a simplified, generic plan view (i.e., overhead view) of a user's family room displayed on a television receiver and showing a given speaker configuration representing the actual equipment which the user possesses, based on data entered by the user in response to the various options presented in an audio configuration menu, not described herein, but fully described in copending U.S. patent application Ser. No. 347,786 (Wehmeyer, et al.) filed 30 Nov. 1994. The left-most portion of FIG. 1 includes "virtual buttons" 101–107 which are operated by a user by positioning a cursor (not shown), or by highlighting areas, by use of MOVE keys generally designated 409, over the particular desired button, and pressing a MENU key 410 on remote control unit 400. The virtual buttons comprise an EXIT Button 101, a HELP button 102, AUDIO PROCESSOR buttons 103, a CONTRAST slide bar 104, and CLOSED CAP DISP (closed caption display) buttons 105. Note that button fields 106 and 107 are unassigned.

Selecting the HELP button 102 causes a display of detailed instructions. Selecting the EXIT button 101 causes a return to the last channel watched. Note that the functions of elements 103–105 are not closely related to one another. That is, one would not normally expect to find them in the same menu. However, for purposes of explanation it is to be assumed that those items came preprogrammed in the FETCH menu from the factory, or that the FETCH menu was empty when the receiver was purchased, and that a user subsequently programmed the first three locations (103–105) with his favorite or frequently used commands. In any event, any command from any menu or submenu can be assigned to any of locations 103–107 of the FETCH menu and thereby be made immediately accessible to the user upon pressing FETCH key 411 of remote control 400.

Figure 2:
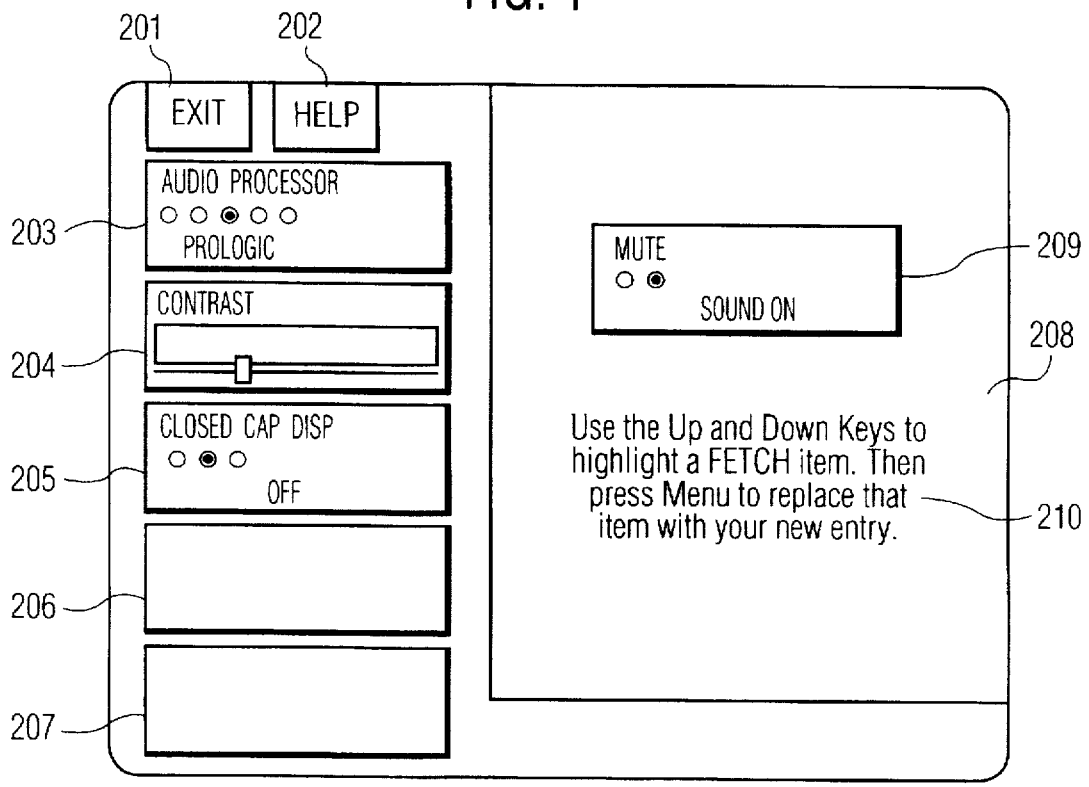
Figure 3:
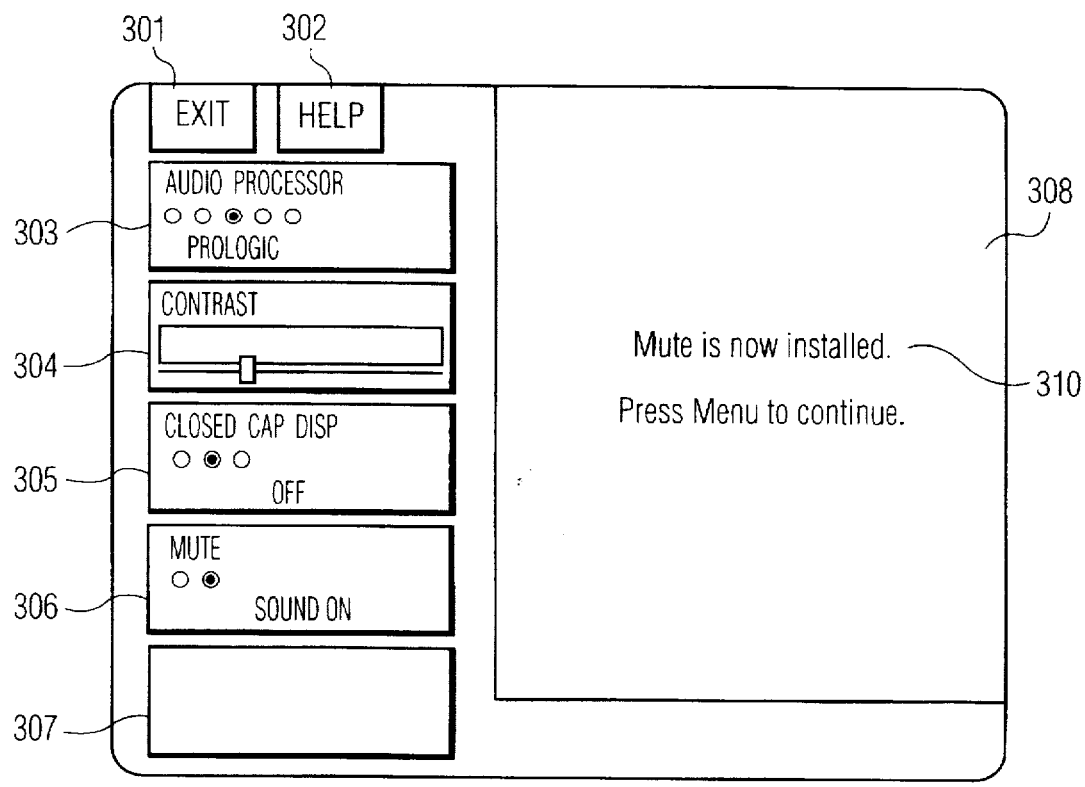

In order to add a command to the FETCH menu, a user first presses MENU key 410 of remote control 400 to enter the menu system in the normal fashion. The user "navigates" (i.e., moves through) the menu hierarchy until coming upon the desired command to be added to the FETCH menu. At that point, the user presses FETCH key 411 which causes the display of FIG. 2 to appear on the display screen Note that the desired command (in this example the MUTE command 209) appears in the display area 208 on the right side of the screen display. The user is then prompted by an on-screen message 210 to move the cursor (or highlighting, other appropriate position indication), by means of the up and down direction keys of key array 409, to the desired placement area (in this example, area 206) for the new command. Upon pressing MENU key 410 the MUTE command will be added to the FETCH menu at the desired location replacing any command previously assigned to that location. The result of this FETCH menu programming operation is shown in FIG. 3, wherein the MUTE command is shown installed in area 306, the user is advised that the MUTE command is installed by a message 310, and is then prompted to press MENU key 410 to continue (i.e., exit this display and return to the original (i.e., last) position in the menuing system.

The above-described Fetch menu exhibits the following advantage in the television environment, over menus in the computer environment. In the television environment, the primary purpose is entertainment, and the user generally does not want to clutter the screen with text and graphics when a television program is being viewed. In contrast, a computer user (whose primary interest is working efficiently), needs immediate access to the menus via a number of continuously displayed onscreen pull-down menu headers and "tool button" graphics. Thus, in a television environment, a customizable menu is a desirable feature, but to be of even greater value, it should be absent from the screen most of the time, yet easily accessible to the user when needed.

Figure 5:
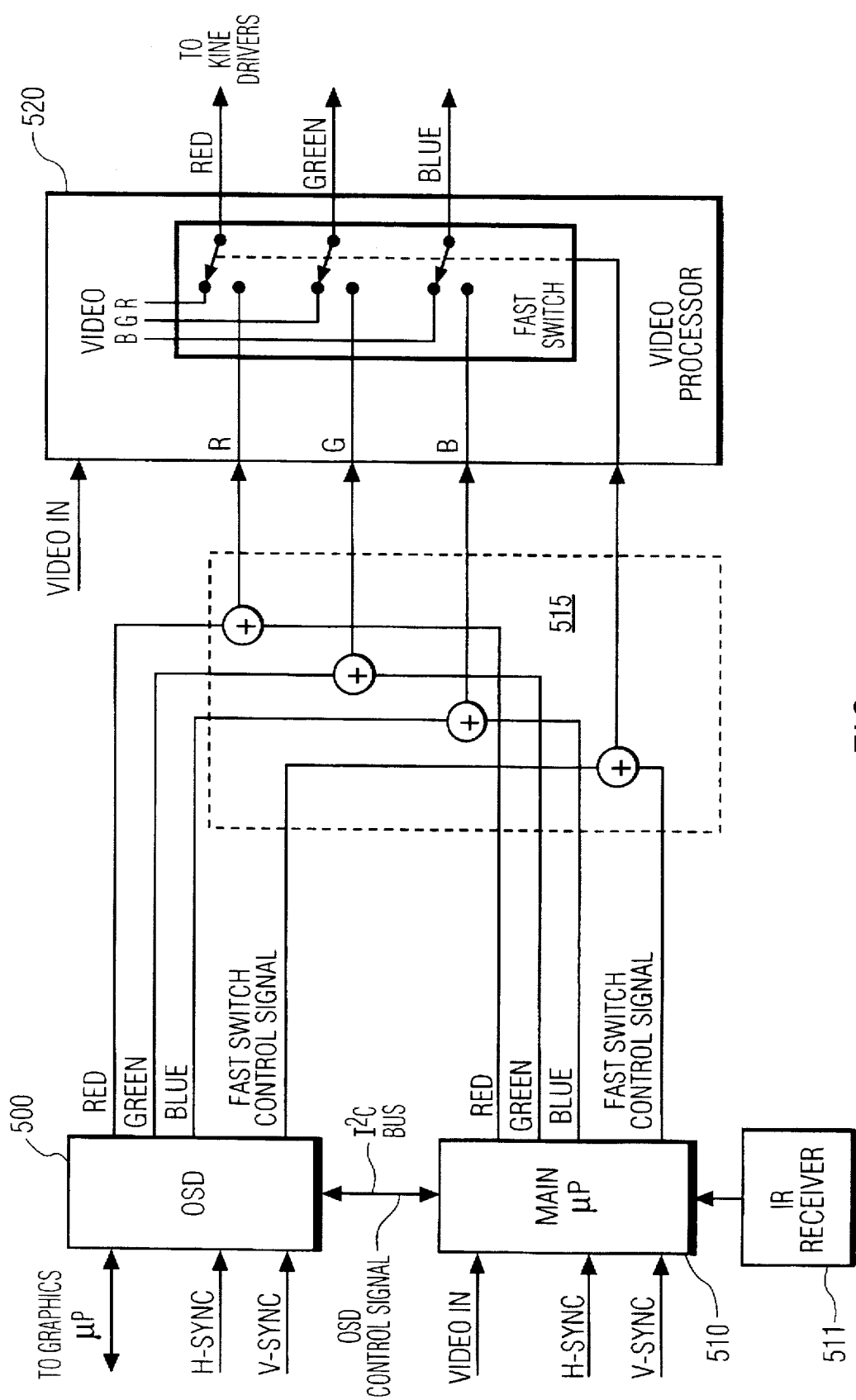
FIG. 5 shows, in block diagram form, the relevant portion of the circuitry of a television receiver operating in accordance with the invention.

FIG. 5 shows a simplified block diagram of that section of the receiver which provides the above-described screen displays. OSD (On Screen Display) Processor 500 is preferably a bit-mapped graphics generator for masking the majority of the display screen with graphics, under control of a Main Microprocessor 510. Main microprocessor 510 receives data input by a user via a local keyboard (not shown) and via an IR receiver 511. OSD Processor 500 produces image signals at Red, Green, and Blue color signal output terminals. Main Microprocessor 510 also receives a video signal from the television chassis and derives closed caption information therefrom. It produces closed caption display signals at Red, Green, and Blue color signal output terminals. The outputs of OSD Processor 500 and of Main Microprocessor 510 are summed together in an array of summing circuits, generally designated 515. These summing circuits may comprise, for example, the well-known non-additive mixer circuit, which has the property that it will pass the greater of the two signals at its inputs while blocking the lesser of the two input signals. The outputs of the summing circuits are applied to a VIDEO PROCESSOR unit 520. A FAST SWITCH control signal generated by either OSD Processor 500 or Main Microprocessor 510 causes the graphics signal (or closed caption signal) to be substituted for the video signal by a FAST SWITCH (shown for simplicity as a controlled 3-pole double throw switch) for the duration of the fast switching signal.

Figure 6:
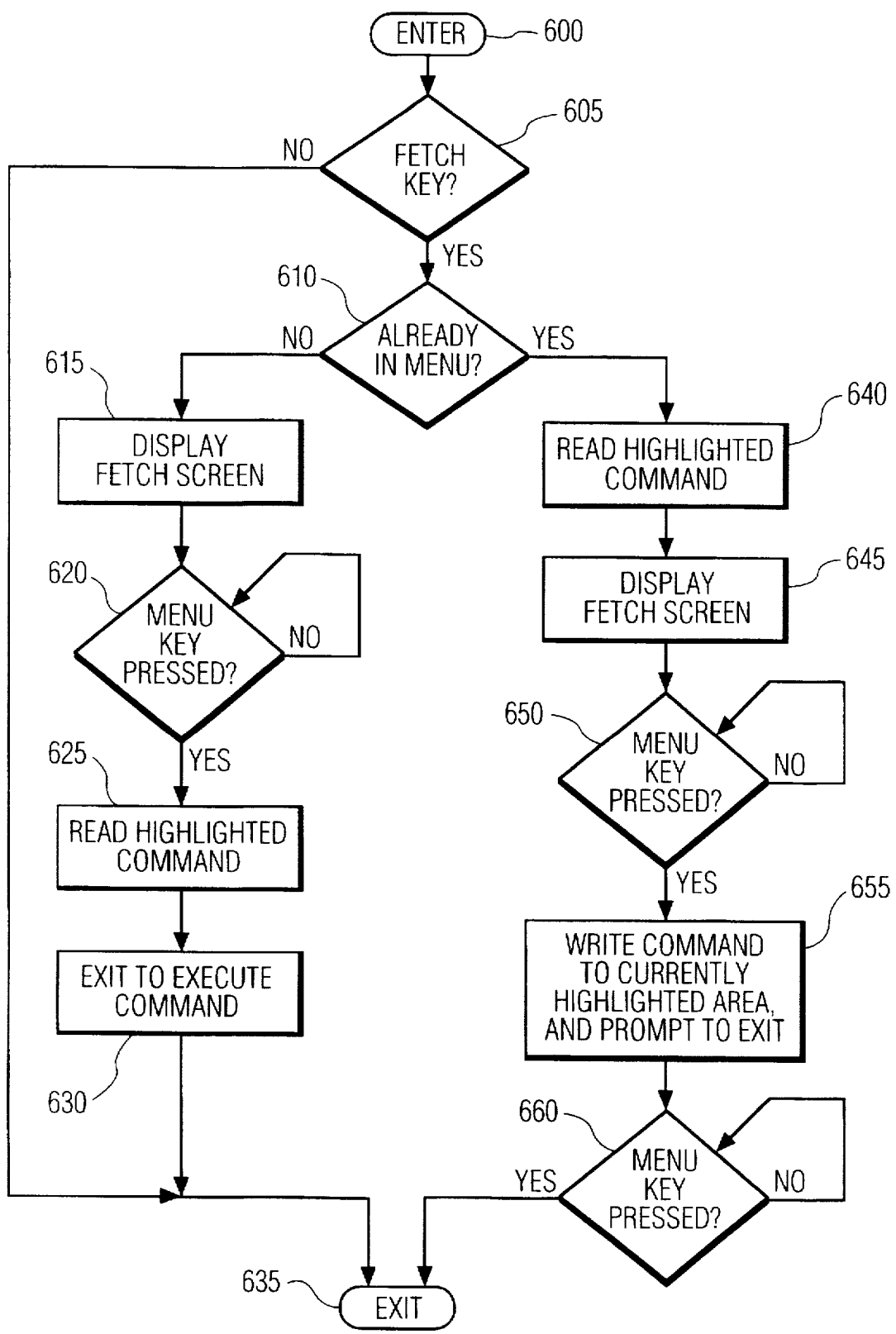
FIG. 6 is a simplified flowchart of a relevant portion of a control program for the microcomputer of FIG. 5.

A simplified flowchart for that portion of the control program of microcontroller 510 which concerns the operation of the FETCH key is shown in FIG. 6. Step 600 is entered upon receipt of a keycode. At step 605 the keycode is examined and a determination is made as to whether or not the keycode is that of the FETCH command. If not, this portion of the routine is exited at step 635, and the program advances to other portions of the keyboard decoding routines. If, at step 605, it is determined that a FETCH command was received, the program advances to step 610 to see if the user is already accessing the menu. This determination is important because there are two distinct modes of operation initiated by the FETCH command. Those modes are, a selection and store mode of operation which is entered if the user is already accessing the menu system, and a display and execute mode of operation which is entered if the user is not accessing the menu system. The display and execute mode of operation is illustrated in the path shown down the left side of FIG. 6 (i.e., steps 615–630), and the selection and store mode of operation is illustrated in the path shown down the right side of FIG. 6 (i.e., steps 640–660). If the user is not accessing the menu system, the NO path is taken from step 610 to step 615 wherein the FETCH screen of FIG. 1 is displayed. At step 620 the program waits for the menu key to be pressed. When it is, the YES path is taken to step 625 at which the currently-highlighted command from the currently accessed branch of the menu system is read. The program then advances to step 630 at which the routine prepares to exit to execute the highlighted command. Preparation for exiting may include clearing the display, and accessing data needed to execute the command, for example. At step 635 the routine is exited.

If, however, at step 610, the user had already accessed the menu system when the FETCH key was pressed, then the user wants to read a command from its normal location in the menu hierarchy, and store it in the FETCH menu. Therefore, the YES path is taken from step 610 to step 640. At step 640, the currently-highlighted command from the currently accessed branch of the menu system is read. At step 645, the FETCH menu of FIG. 2 is displayed. Note that the currently accessed command (in this example, the MUTE command 209) is displayed in a blank area 208 of the screen. At step 650, a check is made to see if the menu key is pressed. If not, the routine loops back repeatedly. If so, the routine advances to step 655, where the "fetched" command (i.e., the command read at step 640), is written to the currently highlighted command location (i.e., one of elements 203–207), as shown in FIG. 3, and a message 310 is displayed to "prompt" (i.e., instruct) the user that the installation process is complete, and that the menu key is to be pressed to exit. Note that the MUTE command is now installed at command location 306.

Figure 7:
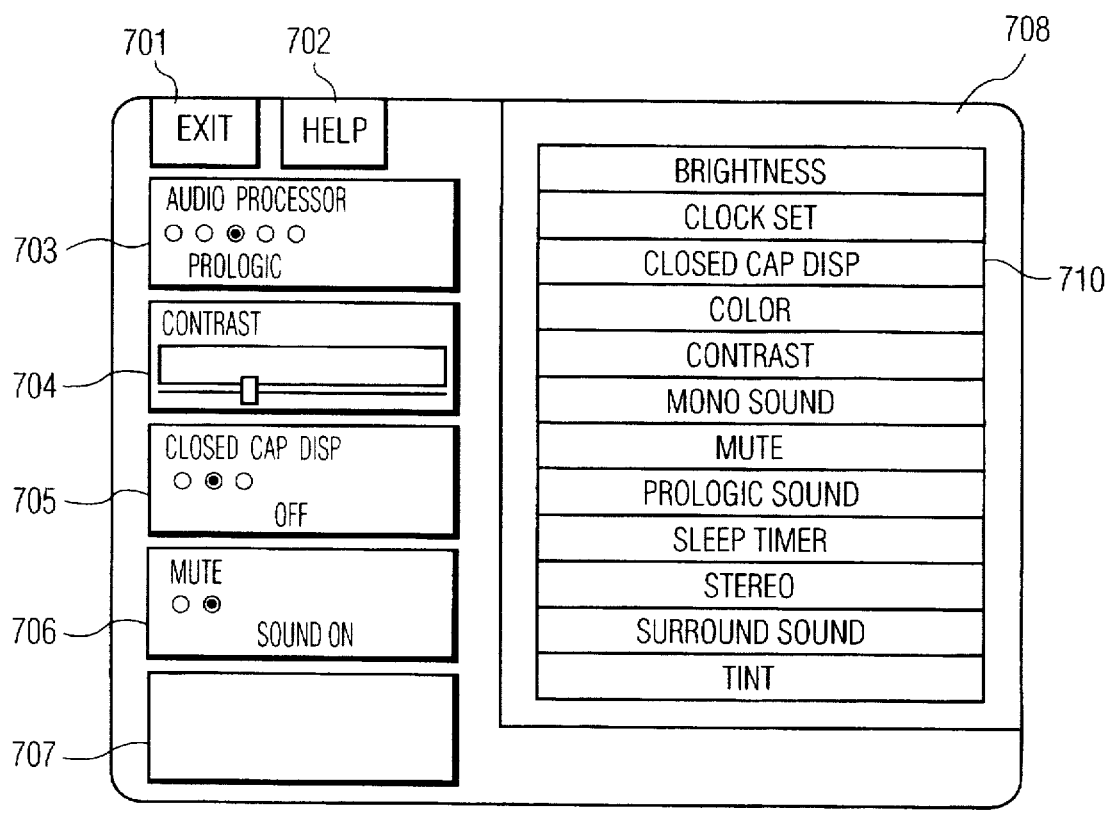

Alternatively, upon pressing the FETCH key while within the menu, a list of commands may be displayed, as shown in FIG. 7. A list 710 may be scrolled up and down in order to find, read, and store the desired command into the FETCH menu locations 703–707. List 710 is shown displayed in a blank area 708. While the list of FIG. 7 is shown displayed in alphabetical order, the list may also be grouped according to function. For example, television picture controls such as brightness, color, contrast, and tint would appear in a first group, and audio controls such as mono, prologic, stereo, and surround sound would appear together in a second group.

Thus, the user-customizable (i.e., modifiable) FETCH menu described above is useful with a graphical display, and is also applicable to a text-based menu, or a combination of the two, and the scope of the claims below is intended to encompass all of the above-recited kinds of menus.

While a single FETCH key is preferred, a combination of keys of the remote control unit, or a menu selection from a main menu may also be used to call up the display of the FETCH menu.

The phrases "system controller", "controller", and "main microprocessor" are used interchangeably herein and are intended to also encompass microcomputers and dedicated custom integrated circuits. The term "television receiver" as used in the specification and claims is intended to encompass television receivers having a display device (commonly called TV sets) and television receivers not having a display device (such as VCRs, satellite receivers, and cable converters).

What is claimed is:

1. A television receiver, comprising:
 a first processor for generating a graphics signal;
 a second processor for processing an input video signal to produce a processed video signal, for coupling said processed video signal to an output during a first mode of operation for providing an output signal suitable for coupling to a display device, and for coupling said graphics signal to said output during a second mode of operation for providing said output signal; and a data input device coupled to said first and second processors and including:

a first key for initiating said second mode of operation upon actuation; said output signal including graphics information representing a menu of selected ones of a plurality of controllable features of said television receiver;

a second key for initiating a third mode of operation upon actuation during said second mode of operation, said graphics signal being coupled to said output during said third mode of operation for including in said output signal graphics information representing a list of said plurality of controllable features of said television receiver; and a third key for controlling navigation within said list of said plurality of controllable features, said menu being modified to include a feature from said list of said plurality of controllable features in response to actuation of said first key during navigation within said list, said second processor returning to said first mode of operation for coupling said video signal to said output upon re-actuation of said first key.

2. The television receiver of claim 1, wherein actuation of said second key during said first mode of operation causes said menu to be displayed on said television receiver for providing control of said controllable features listed in said menu.

3. A television receiver, comprising:

television signal processing means for producing a processed video signal suitable for display on a display device, said television signal processing means having controllable features for controlling the display of said processed video signal;

a controller for generating a control signal;

an on-screen display processor responsive to said control signal for generating a graphics signal suitable for display on said display device and representing a list of said controllable features or representing a main menu listing selected ones of said controllable features, said main menu displaying each of said selected features in a respective predefined location;

switch means coupled to both said processing means and said on-screen display circuitry and responsive to said control signal for selecting between a first mode of operation during which said processed video signal is displayed and a second mode of operation during which said main menu is displayed and connected to said controller for selecting said second mode of operation upon receipt of said control signal; and a data input device for receiving user-entered data and providing said user-entered data to said controller, said data input device comprising:

a first key for generating a mode selection signal upon actuation, said controller generating a switching signal causing said switch means to select said second mode of operation in response to said mode selection signal;

a second key for initiating a third mode of operation upon actuation during said second mode of operation, said controller causing said on-screen display processor to produce said graphics signal representing said list of controllable features; and a third key for navigating within said list of controllable features wherein said main menu is modified by activating said first key to select a desired feature during navigation from said list of controllable features for inclusion in said main menu and navigating said main menu to select a desired one of said predefined locations for placement of said selected feature, said controller causing said switch to return to said first mode of operation upon re-activation of said menu key.

4. The television receiver of claim 3, wherein actuation of said second key during said first mode of operation causes said graphics signal to represent said main menu for providing control of said controllable features listed in said main menu.

5. A television receiver, comprising:

television signal processing means for producing video signals for display on a display device, said television receiver having a plurality of features to be controlled for controlling the display of said video signals;

a controller for generating control signals;

an on-screen display processor for generating a graphics signal representing a list of commands for controlling said plurality of features and representing a main menu listing commands for controlling selected ones of said plurality of features upon receipt of said control signals from said controller, said main menu displaying each of said selected features in a respective predefined location;

switch means coupled to both said processing means and said on-screen display processor for selecting between a first mode of operation in which said video signals are displayed and a second mode of operation in which said main menu is displayed and connected to said controller for selecting said second mode of operation upon receipt of said control signals; and a data input device coupled to said controller for receiving user-entered data from a remote control unit and transmitting said user-entered data to said controller, said remote control unit including:

a menu key for generating a mode selection signal upon actuation, said controller generating a switching signal causing said switch means to select said second mode of operation upon receipt of said mode selection signal;

a fetch key for initiating a third mode of operation upon actuation during said second mode of operation in which said controller causes said list of commands to be displayed on said on-screen display; and a navigation key for navigating said list of commands wherein said main menu is amended by activating said menu key to select a desired feature during navigation from said list of commands for inclusion in said main menu, thereby customizing said main menu based upon the desires of the user, and said controller causes said switch to return to said first mode of operation upon re-activation of said menu key.

6. The television receiver of claim 5, wherein actuation of said fetch key during said first mode of operation causes said graphics signal to represent said main menu for providing control of said controllable features listed in said main menu.

7. A television receiver, comprising:

television signal processing means for producing video signals for reproduction, said television video signals having features to be controlled for affecting the reproduction of said television video signals;

menu generation means for generating a list of commands for controlling said features and a main menu listing selected ones of said commands for controlling said features for display on said television receiver;

switch means coupled to both said processing means and said menu generation means, said switch means being operable between a first mode causing said television video signals to be displayed on said television receiver and a second mode causing said main menu to be displayed on said television receiver;

a data input device including a menu key, a fetch key and a navigation key; and control means coupled to said menu generation means, said switch means and said data input means for generating a control signal in response to actuation of at least one of said menu key, fetch key and navigation key, wherein actuation of said menu key causes said control means to generate a mode selection signal causing said switch means to operate in said second mode;

said fetch key causes said control means to initiate a third mode of operation during said second mode of operation in which said list of controllable features is displayed; and said navigation key causes said control means to generate a navigating signal for navigating said list of commands for controlling said plurality of features wherein said main menu is modified by activating said menu key to select a desired feature from said list of controllable features for inclusion in said main menu during navigation thereby customizing said main menu based upon the desires of the user and said switch is caused to return to said first mode of operation to display said video signal upon re-actuation of said menu key.

8. The television receiver of claim 7, wherein actuation of said fetch key during said first mode of operation causes said control means to control said switch means to display said main menu for providing control of said controllable features listed in said main menu.

9. The television receiver of claim 1 wherein, said graphics signal generated by said first processor represents a hierarchy of menus including a main menu, and said main menu contains default features listed therein before modification by said user.

10. The television receiver of claim 1 wherein, said graphics signal generated by said first processor represents a hierarchy of menus including a main menu, and said main menu lacks features before modification by said user.

11. The television receiver of claim 1 wherein, said graphics signal generated by said first processor represents a hierarchy of menus including a main menu, and said main menu is programmed by said user by navigating through said hierarchy and selecting desired features for inclusion in said main menu as said features are encountered.

12. The television receiver of claim 1 wherein, said graphics signal generated by said first processor represents a hierarchy of menus including a main menu, and said main menu is programmed by said user by selecting desired features for inclusion in said main menu from said hierarchy.

13. The television receiver of claim 3 wherein, said graphics signal generated by said on-screen display processor represents a hierarchy of menus, and said main menu contains default features listed therein before modification by said user.

14. The television receiver of claim 3 wherein, said graphics signal generated by said on-screen display processor represents a hierarchy of menus, and said main menu is absent of features before modification by said user.

15. The television receiver of claim 3 wherein, said graphics signal generated by said on-screen display processor represents a hierarchy of menus, and said main menu is programmed by said user by navigating through said hierarchy and selecting desired features for inclusion in said main menu as said features are encountered.

16. The television receiver of claim 3 wherein, said graphics signal generated by said on-screen display processor represents a hierarchy of menus, and said main menu is programmed by said user by selecting desired features for inclusion in said main menu from said hierarchy.

17. The television receiver of claim 5 wherein, said graphics signal generated by said on-screen display processor represents a hierarchy of menus, and said main menu contains default features listed therein before modification by said user.

18. The television receiver of claim 5 wherein, said graphics signal generated by said on-screen display processor represents a hierarchy of menus, and said main menu is absent of features before modification by said user.

19. The television receiver of claim 5 wherein, said graphics signal generated by said on-screen display processor represents a hierarchy of menus, and said main menu is programmed by said user by navigating through said hierarchy and selecting desired features for inclusion in said main menu as said features are encountered.

20. The television receiver of claim 5 wherein, said graphics signal generated by said on-screen display processor represents a hierarchy of menus, and said main menu is programmed by said user by selecting desired features for inclusion in said main menu from said hierarchy.

* * * * *